July 4, 1933.   H. RUSBULT   1,916,587
BATTERY CHARGING UNIT
Filed March 9, 1932   3 Sheets-Sheet 1

Inventor
Herbert Rusbult
By Clarence A. O'Brien
Attorney

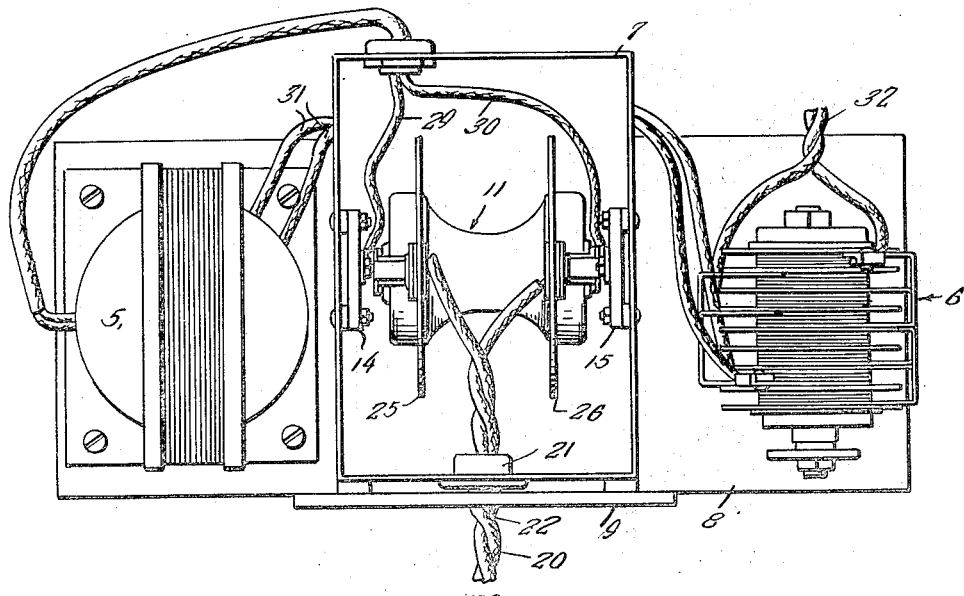
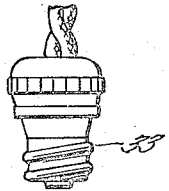
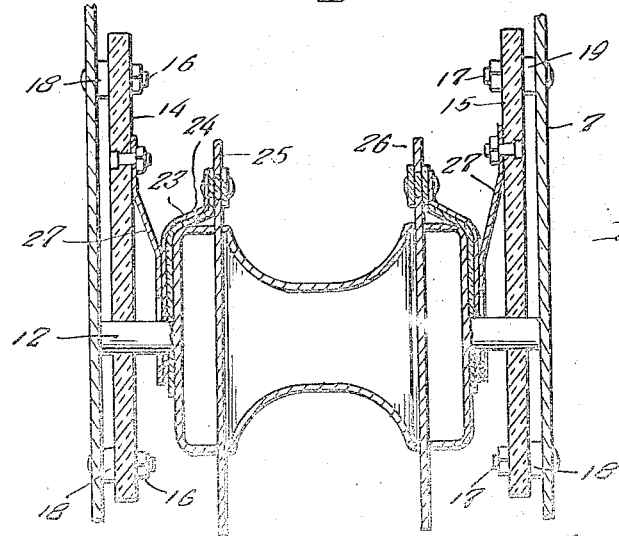

July 4, 1933.  H RUSBULT  1,916,587
BATTERY CHARGING UNIT
Filed March 9, 1932  3 Sheets-Sheet 3

Inventor
Herbert Rusbult
By Clarence A. O'Brien
Attorney

Patented July 4, 1933

1,916,587

UNITED STATES PATENT OFFICE

HERBERT RUSBULT, OF WILLIAMSBURG, IOWA

BATTERY CHARGING UNIT

Application filed March 9, 1932. Serial No. 597,820.

My invention relates to a storage battery charging unit.

It is an object of my invention to provide a compact, specialized battery charging unit for installation in motor vehicles, whereby to enable the charging of the battery of the vehicle from a convenient electrical plug connection in a garage or other place, during short periods of idleness of the vehicle, whereby to enable conveniently maintaining a fully charged condition of the battery of the vehicle at all times.

Other objects and advantages of my invention will be apparent from a reading of the following description of the drawings, wherein for purposes of illustration I have shown a preferred embodiment of the invention.

In the drawings:—

Figure 3 is a top plan view of Figure 1, with the cover of the casing removed.

Figure 7 is a longitudinal vertical sectional view through the reel.

Figure 1:
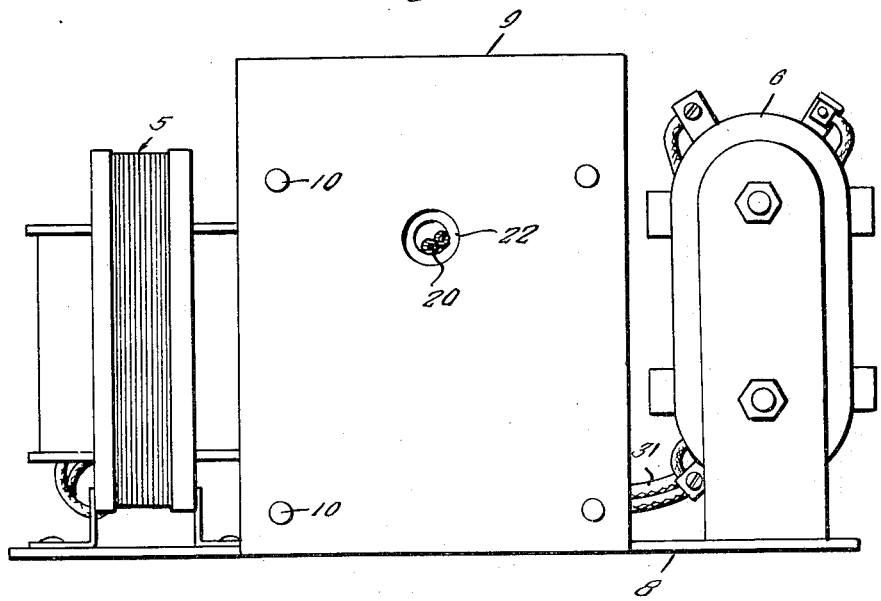
Figure 1 is a general front elevational view of an embodiment of my invention.
Figure 2:
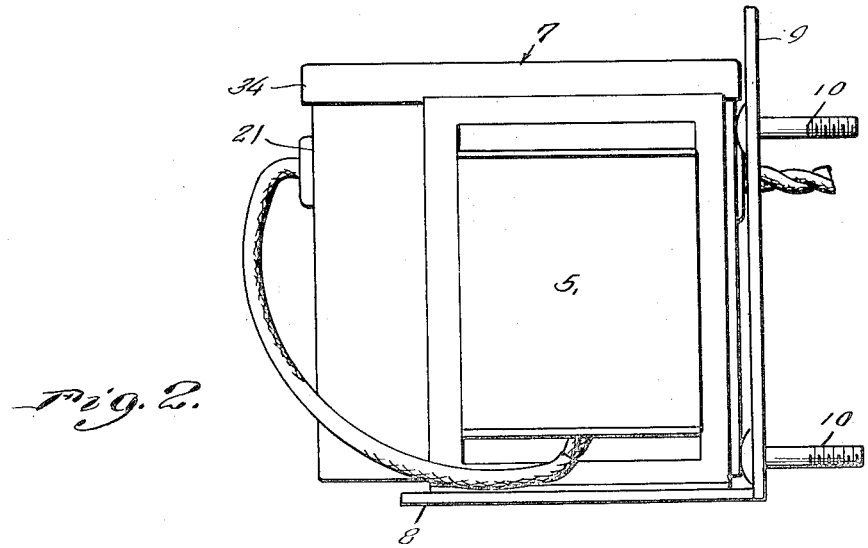
Figure 2 is an end view thereof taken from the left of Figure 1.

Referring in detail to the drawings, wherein like numerals refer to like parts throughout the same, the numeral 5 refers generally to a conventional type of transformer, the numeral 6 to the conventional type of current rectifier, and the numeral 7 indicates a reel casing mounted between the rectifier and the transformer on a base 8.

From one side of the base 8 rises a vertical plate 9 which has bolts or the like 10 projecting therefrom whereby the entire device may be mounted upon a convenient portion of an automobile or similar vehicle, such as on the dash board or upon a frame member, whereby to solidly mount the device conveniently close to the battery of the vehicle.

Within the casing 7 which is of generally rectangular form there is rotatably mounted a reel 11 which is in the form of a hollow spool having stub axles 12 and 13 journaled in dielectric blocks 14, 15 secured to opposite end walls of the casing 7 as shown. The dielectric blocks 14, 15 are secured by bolts 16, 17 which carry spacers 18, 19 for spacing the dielectric blocks 14, 15 from the casing walls. This arrangement is particularly well shown in Figure 7. Suitable return spring means is incorporated in the spool whereby the double cord 20 will be suitably released upon pulling the same outwardly through the bushing 21 and through the opening 22 in the upright plate 9 and will be rewound upon the reel by automatic rotation thereof when released.

Figure 4:
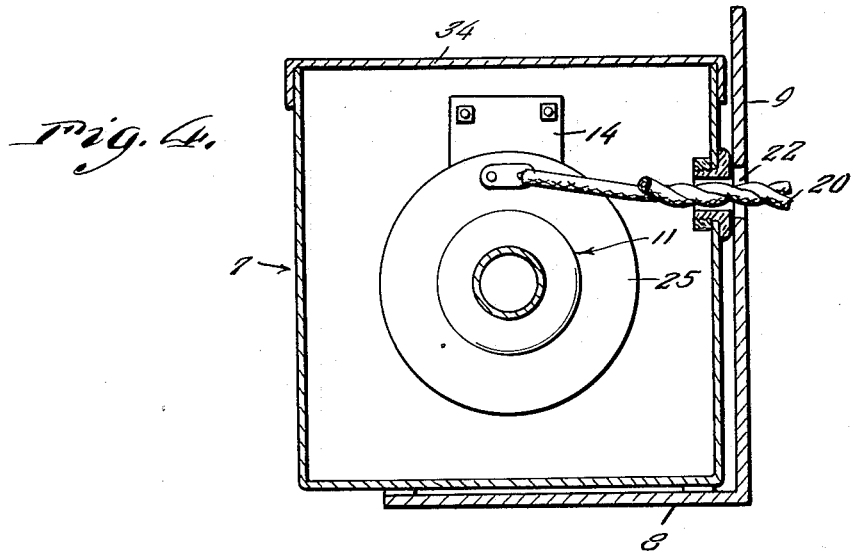
Figure 4 is a transverse vertical central sectional view through Figure 1.
Figures 5, 6:
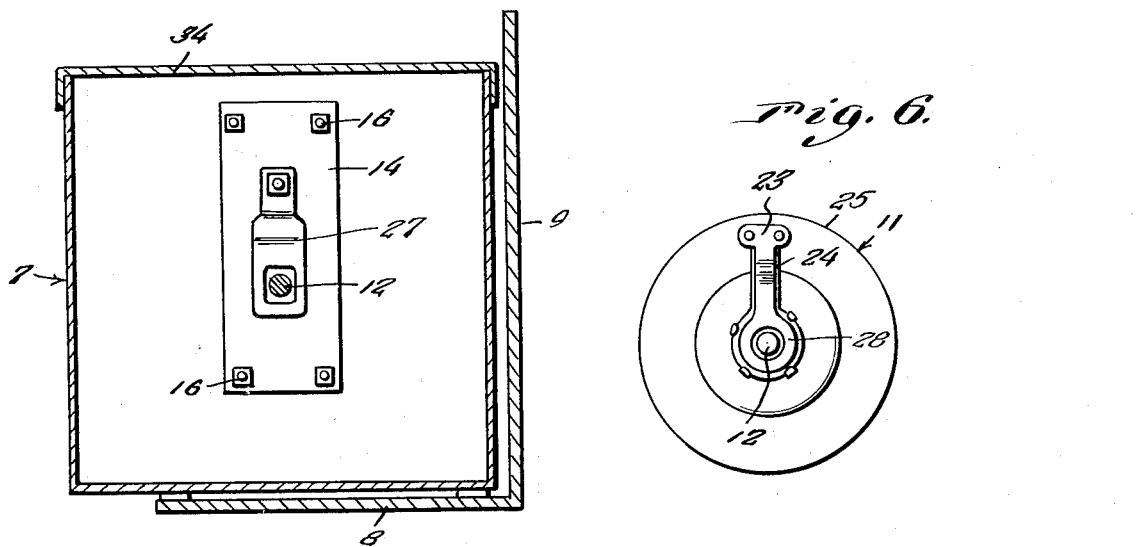
Figure 5 is a transverse vertical sectional view taken at one side of the reel.
Figure 6 is an end view of one of the spring retainers of the reel.

Suitable spring contact means comprising an exterior metallic leaf 23 and an interior conforming dielectric leaf 24 secured to longitudinally spaced flanges 25, 26 carried by the spool are arranged for rotatable contact with stationary contact elements 27 carried on the dielectric blocks 14, 15, as will be seen in Figures 6 and 5. The contact elements 27 have a square aperture in which the stub shaft 12 rotates without contacting them, and the leaves 23, 24 of the rotatable contact members also have apertures 28 whose edges are similarly spaced out of contact with the shaft 12. This arrangement permits rotation of the spool or reel while maintaining electrical connection at each side thereof with the remaining elements of the device. It will be observed that the double cord 20 has one of its cords connected to the contact leaves on the flange 25, while the remaining cord is connected to the leaves carried by the flange 26 as seen particularly well in Figures 3 and 4.

Examination of Figure 3 will disclose that one set of cords from the rectifier indicated by the numerals 29, 30 are connected respectively with the contacts 27 which correspond to the spool contact leaves, while the remaining leads 31 from the rectifier are carried around or through the casing for connection with the transformer, and that the leads 32 that is the supply leads are led directly to the battery of the vehicle to which they are permanently connected, the negative terminal being connected usually with the frame of the car and the positive connected to the battery in a well known manner.

It will be observed that all that is necessary to do when it is desired to charge the battery while the vehicle is standing near a suitable source of electricity, is to connect the plug 33 on the reel cord 20 in the nearest socket, by unreeling the cord from the reel by pulling upon the same. When it is desired to cease charging the battery, all that it is necessary to do is to remove the plug 33 from the supply socket, and release the reel cord, whereupon the reel cord will be drawn into the casing and wound upon the reel 11.

If desired the entire device described may be encased in a suitable box like formation, provided with sufficient ventilation means.

A lid 34 may be provided for the casing 5.

The need of a device according to the principle of my invention is evident at the present time since the introduction and popular use of electrically operated devices on automobiles, such as radios, heaters, freewheeling devices and the like which enormously increase the normal drain upon the battery of the automobile. It is a distinct advantage to be enabled in a convenient and inexpensive manner to recharge the battery of the automobile so as to maintain the same continually properly charged, without resorting to leaving the battery at a battery charging station with consequent large expense and trouble and loss of time, and the inconvenience possibly resulting from the use of rental batteries.

Though I have shown and described herein a preferred embodiment of the invention, it is to be definitely understood that I do not desire to limit the application of the invention thereto, but any change or changes may be made in material and structure and arrangement of parts consistent with the spirit of the invention and the scope of the subjoined claim.

What is claimed is:—

A battery charging unit for a vehicle having a battery, said unit comprising a base mountable on the vehicle, a transformer, a rectifier, and extensible input connection means on the base, said extensible input connection means comprising a casing, a reel rotatably mounted within the casing, transformer and rectifier input conductors brought into the casing, contacts mounted in the casing to which the input conductors are connected, contact members on the reel for electrical engagement with the contacts, reel input conductors windable on the reel and connected with the contact members, and output conductors leading from the rectifier for selective connection to the battery, and connector means on the outer ends of the reel input conductors for connection to any available current outlet for charging the battery.

In testimony whereof I affix my signature.

HERBERT RUSBULT.